(12) United States Patent
Chang

(10) Patent No.: US 8,182,257 B2
(45) Date of Patent: May 22, 2012

(54) LIGHT GUIDE PLATE MOLD

(75) Inventor: Jen-Tsorng Chang, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/241,256

(22) Filed: Sep. 23, 2011

(65) Prior Publication Data

US 2012/0009296 A1   Jan. 12, 2012

Related U.S. Application Data

(62) Division of application No. 12/482,370, filed on Jun. 10, 2009, now Pat. No. 8,052,901.

(30) Foreign Application Priority Data

Sep. 25, 2008 (CN) .......................... 2008 1 0304664

(51) Int. Cl.
*B29C 35/00* (2006.01)

(52) U.S. Cl. ............ 425/384; 249/78; 249/79; 264/1.24

(58) Field of Classification Search .................. 425/384; 249/78, 79; 264/1.24, 327
See application file for complete search history.

(56) References Cited

U.S. PATENT DOCUMENTS

| 2005/0110174 A1* | 5/2005 | Chen ........................ 264/1.34 |
| 2005/0142499 A1* | 6/2005 | Chen ........................ 430/321 |
| 2005/0194351 A1* | 9/2005 | Yu et al. ....................... 216/24 |
| 2008/0000373 A1* | 1/2008 | Petrucci-Samija et al. ............ 101/401.1 |
| 2008/0093764 A1* | 4/2008 | Ito et al. ..................... 264/101 |

* cited by examiner

*Primary Examiner* — Robert J Hill, Jr.
*Assistant Examiner* — Ninh Le
(74) *Attorney, Agent, or Firm* — Altis Law Group, Inc.

(57) ABSTRACT

A light guide plate mold is configured for manufacturing a light guide plate having a number of microstructures. The light guide plate mold includes a substrate and a number of heating members. The substrate defines a number of grooves therein. The heating members are respectively received in the grooves. Each heating member has a height less than a depth of the corresponding groove. The grooves and the heating members cooperatively define a number of receiving spaces for forming the microstructures of the light guide plate.

8 Claims, 7 Drawing Sheets providing a light guide plate mold including a substrate defining a number of grooves and a number of heating members received in the corresponding grooves respectively

↓ placing a light guide plate substrate on the light guide plate mold

↓

Actuating the heating members to melt the portions of the light guide plate substrate corresponding to each heating member of the light guide plate mold to fill in each receiving space cooperatively defined by each groove and a corresponding heating member

↓

Cooling the light guide plate substrate and the light guide plate mold

↓

Removing the light guide plate mold to form the light guide plate having the microstructures corresponding to the receiving spaces

FIG. 2

LIGHT GUIDE PLATE MOLD

CROSS REFERENCE TO RELATED APPLICATION

This application is a divisional application of application, entitled "LIGHT GUIDE PLATE MOLD AND METHOD FOR MANUFACTURING LIGHT GUIDE PLATE USING SAME", with application Ser. No. 12/482,370 filed on Jun. 10, 2009, which is now U.S. Pat. No. 8,052,901. The content of the above-referenced application is hereby incorporated by reference.

BACKGROUND

1. Technical Field

The present disclosure relates to molds and, particularly, to a light guide plate mold and a method for manufacturing a light guide plate having microstructures.

2. Description of Related Art

Generally, light guide plates having microstructures may be manufactured by injection molding. The microstructures are a plurality of light diffusing materials such as titanium oxide and silicon dioxide. The diffusing materials are used to disperse what would otherwise be single internal reflections of incident light in the light guide plates so as to form an uniform luminance for light guide plates. In addition, the substrates of the light guide plates need to be clean, thus the manufacturing method is time-consuming.

Therefore, it is desirable to provide a light guide plate mold and a method for manufacturing a light guide plate having microstructures which can overcome or at least alleviate the above-mentioned problem.

BRIEF DESCRIPTION OF THE DRAWINGS

FIG. 2 is a flowchart of the first embodiment of a method for manufacturing a light guide plate using the light guide plate mold shown in FIG. 1.

DETAILED DESCRIPTION

Embodiments of the disclosure will now be described in detail with reference to the accompanying drawings.

Figure 1:
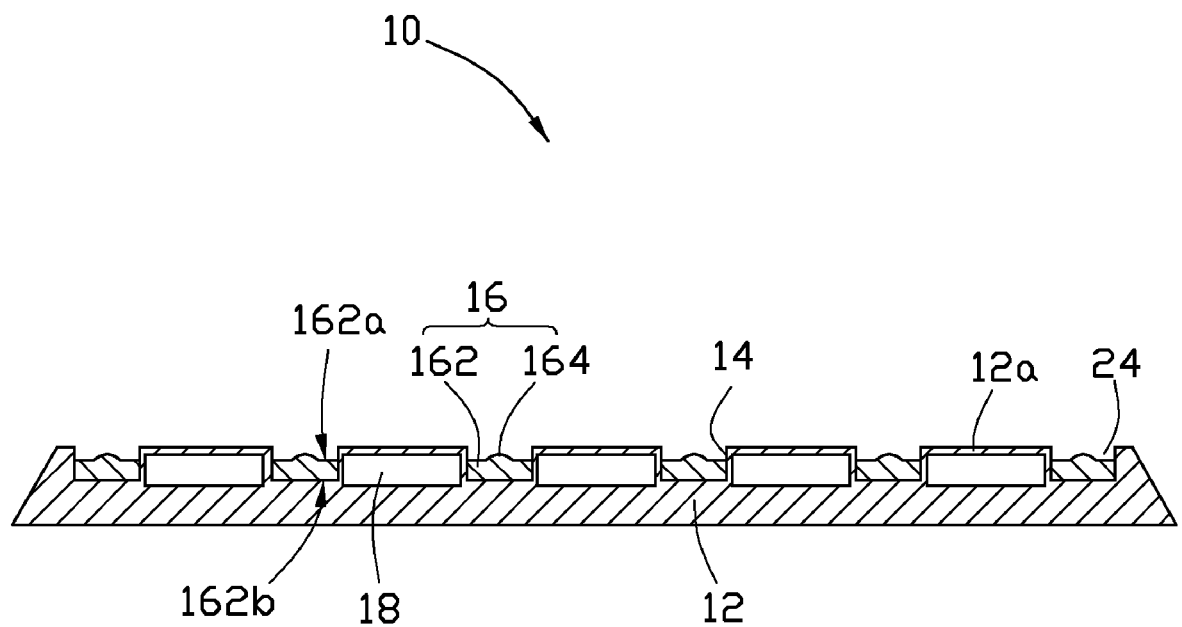
FIG. 1 is a schematic view of the light guide mold including a number of heating members according to a first embodiment.

Referring to FIG. 1, a light guide plate mold 10 used for manufacturing a light guide plate having microstructures according to a first embodiment includes a substrate 12 and a number of heating members 16.

The substrate 12 can be made of metal or ceramic. The size of the substrate 12 can be designed according to the size of the light guide plate. The substrate 12 has a first surface 12a and defines a number of grooves 14 in the first surface 12a of the substrate 12. In this embodiment, the shape of the grooves 14 cross-section is square. In this embodiment, uniform intervals are maintained between the grooves 14.

The heating members 16 are respectively received in the grooves 14. Each heating member 16 includes a main body 162 and a pattern 164. The main body 162 includes a first surface 162a and second surface 162b opposite to the first surface 162a. When each heating member 16 is received in each corresponding groove 14, the second surface 162b of each main body 162 contacts the bottom portion of the groove 14. The pattern 164 is disposed on the first surface of the main body 162. The shape of the pattern 164 is designed according to need of users, such as protrusion or recess. In this embodiment, the pattern 164 is a protrusion and integrated with the main body 162. Each heating member 16 has a height less than a depth of the corresponding groove 14. Such that, the grooves 14 and the heating members 16 cooperatively define a number of receiving spaces 24.

A number of cooling members 18 are disposed in the substrate 12 of the light guide plate mold 10. Each cooling member 18 is positioned between the adjacent grooves 14. The cooling members 18 are configured for cooling a light guide plate substrate to be molded. In this embodiment, the cooling members 18 are heat pipes.

Referring to FIG. 2, a method for manufacturing a light guide plate having a number of microstructures includes the following steps: providing a light guide plate mold including a substrate defining a number of grooves and a number of heating members respectively received in the corresponding grooves, the grooves and the heating members cooperatively defining a number of receiving grooves; placing a light guide plate substrate on the light guide plate mold; melting the portions of the light guide plate substrate spatially corresponding to the heating members using the heating member such that the receiving spaces are filled with the melted portions of the light guiding plate substrate; cooling the light guide plate substrate and the light guide plate mold; removing the light guide plate mold to form the light guide plate having the microstructures corresponding to the receiving spaces.

Figure 3:
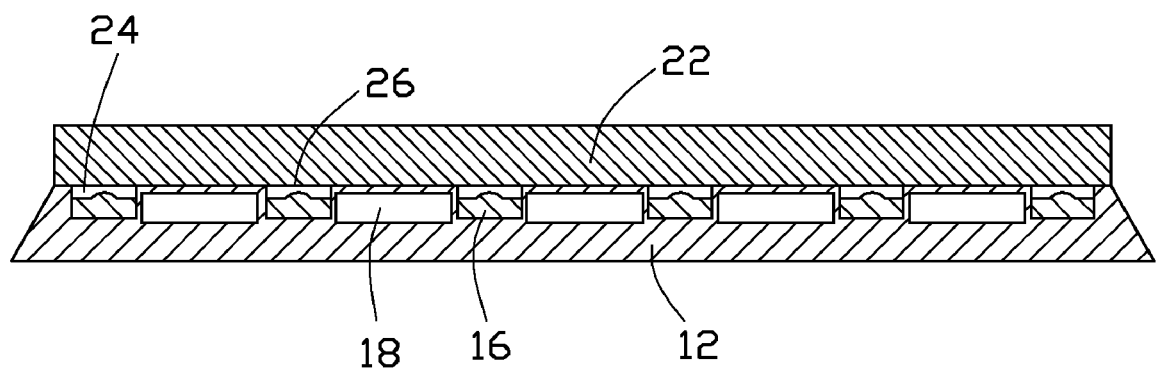
FIGS. 3-5 are schematic views of a light guide plate placed on the light guide mold in three stages of performing the method shown in FIG. 2.

Referring to FIG. 3, a light guide plate substrate 22 is placed on the first surface 12a of the substrate 12 of the light guide plate mold 10.

Figure 4:
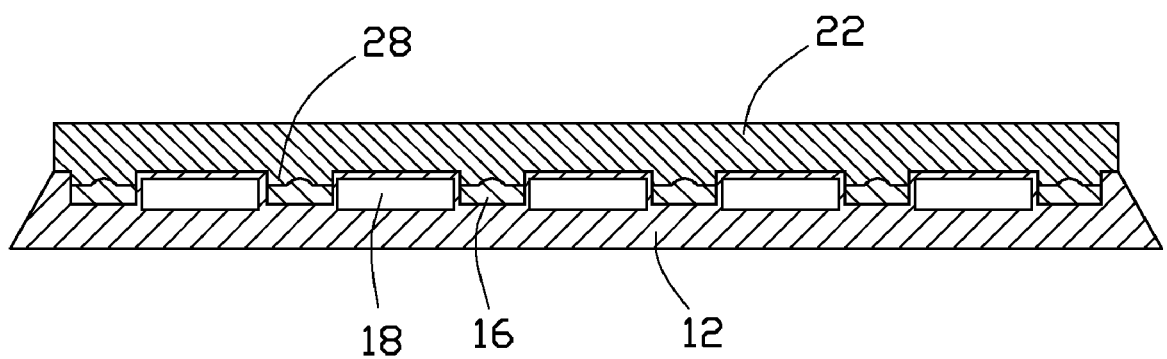

Referring to FIG. 4, when each heating member 16 is actuated, the portions 26 of the light guide plate substrate 22 spatially corresponding to the grooves 14 are melted. The receiving space 24 are filled the melted portions of the light guide plate substrate 22 to form microstructures 28. Shape of each receiving space 24 is corresponding to each microstructure 28 needed to form in the light guide plate 20.

The temperature of the portions of light guide plate substrate 22 between the microstructures 28 is high due to actuating the heating members 16, especially when the substrate 12 is made of metal. In order to prevent the light guide plate substrate 22 from deforming, especially the portions of light guide plate substrate 22 between the microstructures 28, the cooling members 18 are provided to dispose in the substrate 12 of the light guide plate mold 10 and advantageously position between the adjacent grooves 14 for effectively cooling the light guide plate substrate 22.

Figure 5:
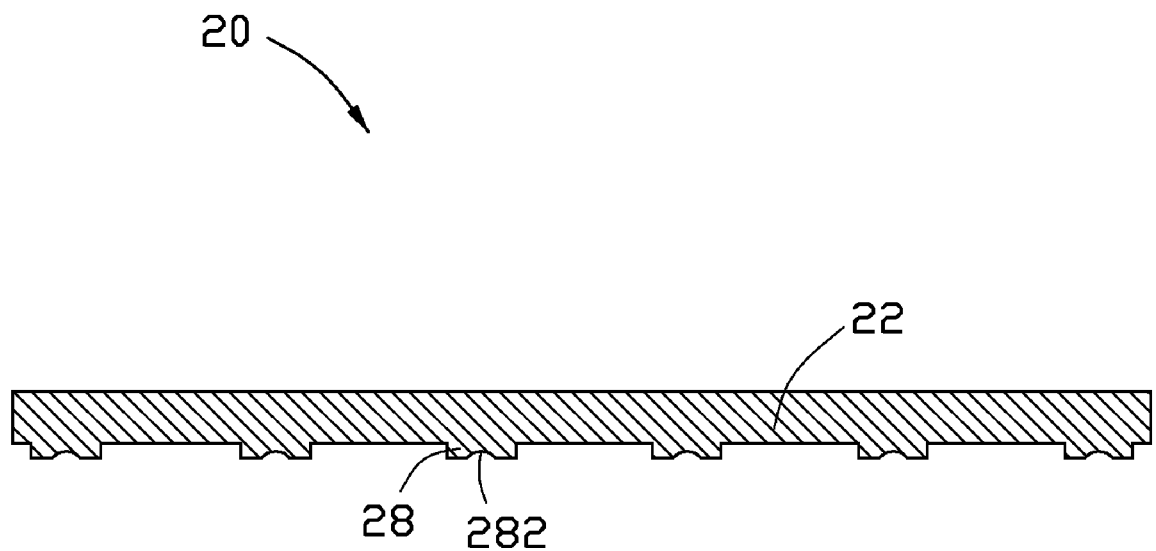

After the microstructures 28 are formed, the light guide plate substrate 20 is cooled to solidify the microstructures 28. Referring to FIG. 5, the light guide plate mold 10 is removed to obtain the light guide plate 20 having the microstructures 28. In this embodiment, each microstructure 28 has a recess 282 corresponding to the pattern 164. It is to be understood, after removing the light guide plate mold 10, the light guide plate substrate 22 of the light guide plate 20 then undergoes a polishing process.

Figure 6:
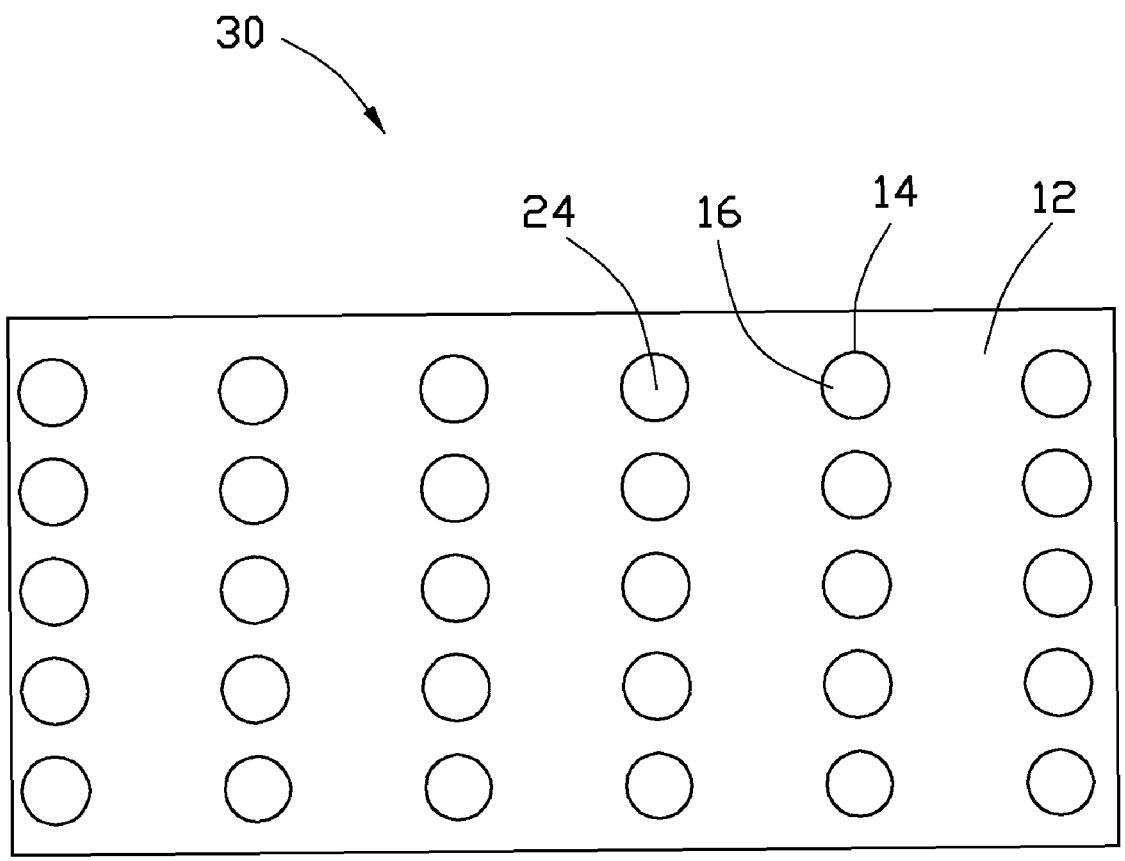
FIG. 6 is a plan view of a light guide mold according to a second embodiment.

FIG. 6 is a plan view of a light guide mold 30 according to a second embodiment. The light guide mold 30 is similar to the light guide mold 10 of the first embodiment except that the shape of the grooves 14 cross-section is circular. In this embodiment, the heating members 16 are circular, correspondingly to the grooves 14. In this embodiment, the substrate 12 is made of ceramic. The receiving spaces 24 cooperatively formed by the grooves 14 and heating members 16 are circular.

Figure 7:
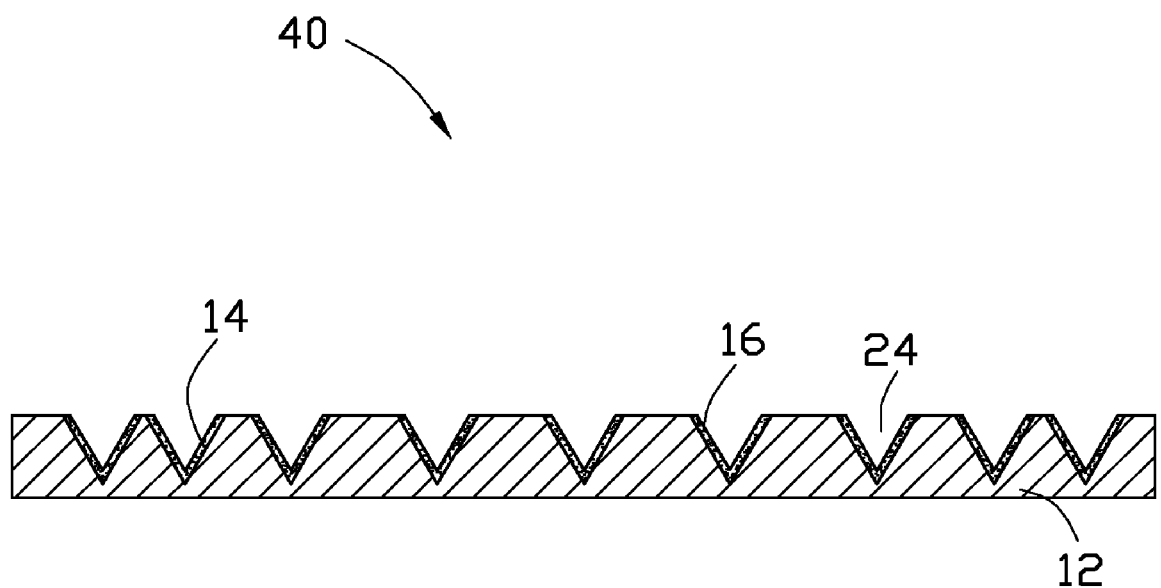
FIG. 7 is a schematic view of a light guide mold according to a third embodiment.

FIG. 7 is a schematic view of a light guide mold 40 according to a third embodiment. The light guide mold 40 is similar to the light guide mold 10 of the first embodiment except that the shape of the grooves 14 cross-section is V-shaped. In this embodiment, the heating members 16 are V-shaped correspondingly to the grooves 14. In this embodiment, the substrate 12 is made of ceramic. The receiving spaces 24 cooperatively formed by the grooves 14 and heating members 16 are V-shaped.

The heating member of the light guide plate mold can be designed according to the grooves to form corresponding microstructures on the light guide plate, thus the light guide plate mold is convenient for users. The light guide plate is manufactured by heating the heating member of the light guide plate mold, thus the method for manufacturing the light guide plate using the light guide plate mold is simple and time-saving.

It is to be understood, however, that even though numerous characteristics and advantages of the embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. A light guide plate mold for manufacturing a light guide plate having a plurality of microstructures, the light guide plate mold comprising:
   a light guide plate mold substrate defining a plurality of grooves therein;
   a plurality of heating members respectively received in the grooves, each heating member having a height less than a depth of the corresponding grooves, the grooves and the heating members cooperatively defining a plurality of receiving spaces for forming the microstructures of the light guide plate; and
   a plurality of cooling members, each cooling member positioned between two corresponding adjacent grooves of the light guide plate mold substrate.

2. The light guide plate mold of claim 1, wherein the cooling members are heat pipes.

3. The light guide plate mold of claim 1, wherein the substrate is made of metal.

4. The light guide plate mold of claim 1, wherein the substrate is made of ceramic material.

5. The light guide plate mold of claim 1, wherein each heating member comprises a main body comprising a first surface and an opposite second surface contacting the bottom of the corresponding groove, and a pattern formed on the first surface of the main body.

6. The light guide plate mold of claim 5, wherein the pattern is a protrusion.

7. The light guide plate mold of claim 1, wherein the shape of the grooves in cross-section is circular.

8. The light guide plate mold of claim 1, wherein the shape of the grooves in cross-section is V-shaped.

* * * * *